United States Patent [19]

Suttrop

[11] Patent Number: 5,832,718
[45] Date of Patent: Nov. 10, 1998

[54] COMBUSTION CHAMBER ESPECIALLY FOR A GAS TURBINE ENGINE USING HYDROGEN AS FUEL

[75] Inventor: Friedemann Suttrop, Aachen, Germany

[73] Assignee: Daimler-Benz Aerospace Airbus GmbH, Hamburg, Germany

[21] Appl. No.: 770,725

[22] Filed: Dec. 18, 1996

[30] Foreign Application Priority Data

Dec. 19, 1995 [DE] Germany .......................... 195 47 515.1

[51] Int. Cl.⁶ .............................. E02C 3/22; E02C 7/224
[52] U.S. Cl. ............................................ 60/39.465; 60/736
[58] Field of Search ................................ 60/39.465, 736, 60/737, 39.05, 39.52, 39.55, 267

[56] References Cited

U.S. PATENT DOCUMENTS 2,221,477  12/1940  Powter et al. ............................ 60/737
3,237,400   3/1966  Kuhrt ....................................... 60/736

FOREIGN PATENT DOCUMENTS 1104211  11/1955  France ..................................... 60/736

*Primary Examiner*—Louis J. Casaregola
*Attorney, Agent, or Firm*—W. F. Fasse; W. G. Fasse

[57] ABSTRACT

A combustion chamber for a gas turbine using hydrogen as fuel, is equipped with an evaporator for liquid hydrogen which converts the hydrogen into its gaseous form that is fed directly or for instance via an external control valve into the combustor. The evaporator covers and protects at least a portion of the inner and/or outer wall that encloses the combustion chamber, whereby the evaporator also cools the combustion chamber while converting the liquid hydrogen to gaseous hydrogen.

13 Claims, 2 Drawing Sheets

COMBUSTION CHAMBER ESPECIALLY FOR A GAS TURBINE ENGINE USING HYDROGEN AS FUEL

FIELD OF THE INVENTION

The invention relates generally to combustion chambers and particularly to such chambers useful in gas turbine engines using hydrogen as fuel. Such combustion chamber generally includes a housing, a combustor or burner, and a flame tube.

BACKGROUND INFORMATION

Combustion chambers of the type mentioned above comprise a gap between the housing and the flame tube for flowing cooling air through the gap which leads into a cooling air guide channel around the flame tube. If the hydrogen is supplied to the combustion chamber of the gas turbine engine in the form of liquid hydrogen, but shall be combusted in its gaseous state, it is necessary to provide an evaporator for the liquid hydrogen. Various constructions and arrangement of such evaporators are known in the art. Thus, it is for example known to position the evaporator in the exhaust gas stream of the turbine. According to another conventional arrangement, the evaporator is positioned in the area of the compressor where it functions as an intermediate cooler between two compressor stages. Yet another conventional construction positions the evaporator at the entrance to the combustion chamber. This last mentioned position of the evaporator requires only short fluid ducts. However, all the other conventional constructions require fluid ducts of substantial length between the evaporator and the combustion chamber. Such long ducts have an adverse effect on the speed with which the turbine reacts to control measures. A disadvantage common to all conventional constructions resides in the danger that ice may be formed on the evaporator.

OBJECTS OF THE INVENTION

In view of the above it is the aim of the invention to achieve the following objects singly or in combination:

to construct a combustion chamber of the type described above in such a way that it is integrated with an evaporator;

to efficiently cool the combustion chamber with the help of the evaporator; and to avoid the drawbacks of conventional structures of this type, especially ice formations are to be avoided.

SUMMARY OF THE INVENTION

According to the invention the above objects have been achieved in a combustion chamber for operating a gas turbine with hydrogen as fuel, which is characterized in that an evaporator having an inlet port for liquid hydrogen and an outlet port for gaseous hydrogen is arranged inside the flame tube of the combustion chamber in such a position that the evaporator covers at least a portion of the inner surface of the flame tube.

Preferably, the evaporator is constructed as a pipe helically wound into a coil or it is constructed as a double wall of the combustion chamber, whereby the exit port for the gaseous hydrogen is directly connected with the combustor.

By integrating the evaporator with the wall of the flame tube of the turbine combustion chamber, the invention achieves the special advantage that an efficient and effective cooling of the combustion chamber is provided by a recuperative heat exchange between the flame tube walls and the evaporator. Simultaneously, the invention avoids the conventional need for separate cooling features for the combustion chamber wall, such as a film cooling or veil or mist cooling by passing a coolant into contact with the combustion chamber walls. Thus, the invention avoids or substantially reduces the use of cooling air for the purpose of cooling the combustion chamber, whereby the saved air portion can be supplied into the combustion chamber for sustaining the combustion.

By integrating the evaporator with the combustion chamber as taught herein, the formation of ice on the evaporator is more easily avoided than in conventional structures due to the high pressures and high temperatures in the combustion chamber.

Further, the construction of the evaporator as a double wall or as a helically wound pipe has the advantage that it is a simple construction which is economical to produce.

BRIEF DESCRIPTION OF THE DRAWING

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
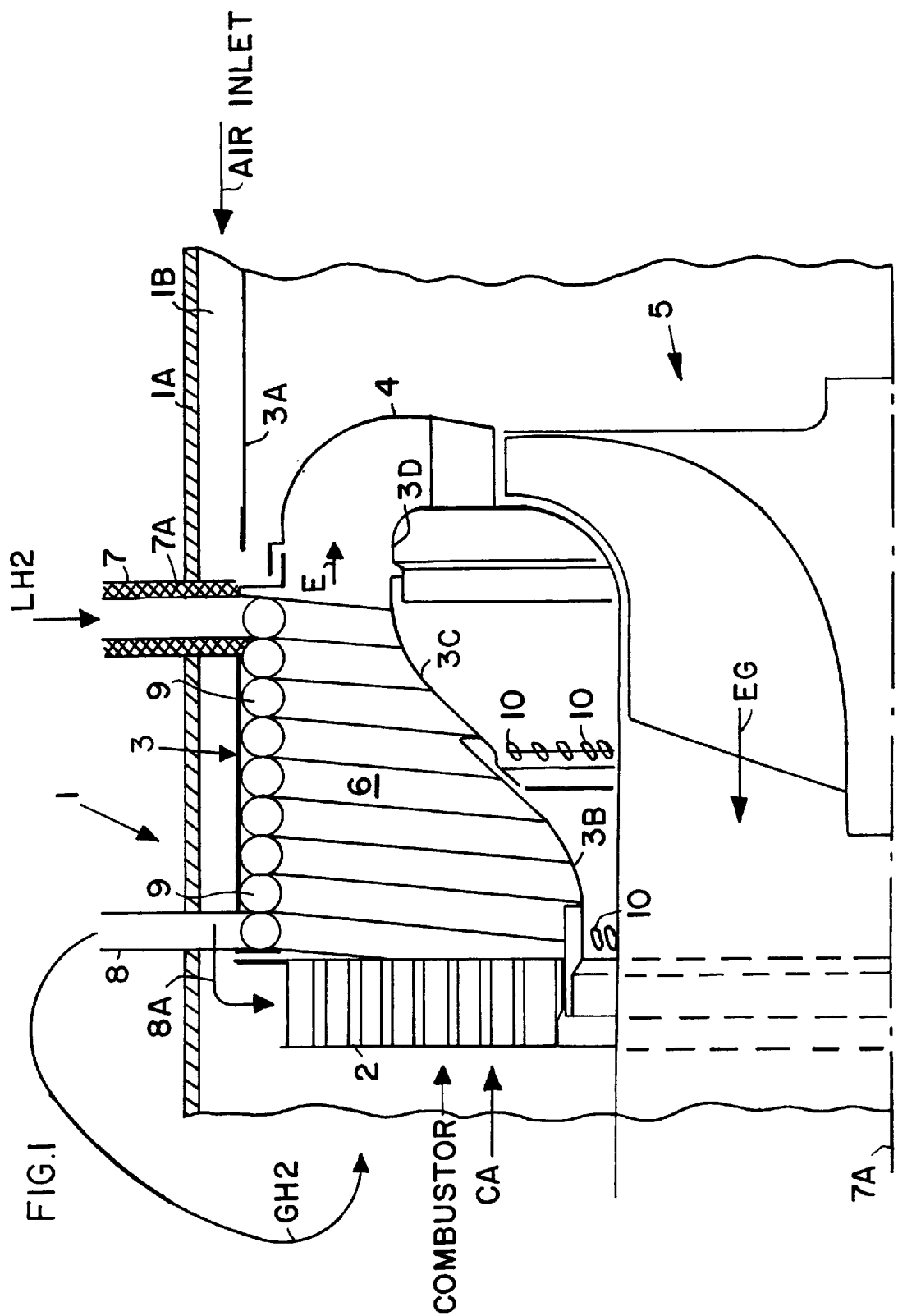
FIG. 1 shows a schematic axial sectional view through a combustion chamber and evaporator according to the invention shown as part of a radial turbine stage.

FIG. 1 shows a combustion chamber constructed, for example, as a ring combustion chamber 1 having a housing 1A enclosing a combustor or burner 2 and a flame tube 3 having a radially outer wall 3A and radially inner wall sections 3B, 3C, 3D enclosing a combustion chamber, the front end of which is closed by the combustor 2. An air channel 1B surrounds the flame pipe wall 3A and feeds combustion air CA into the combustor 2. The combustion gases E flow through an exit 4 of the flame tube 3 into a radial turbine 5. Exhaust gases leave the radial turbine 5 as indicated by the arrow EG. The air channel 1B, the flame tube wall 3A, 3B, 3C, 3D, and the evaporator 6 form rings around a central turbine axis 7A.

According to the invention an evaporator 6 is integrated with and positioned in heat exchange contact with a heat tube wall surface facing inwardly into the flame tube ring volume of the flame tube 3. In FIG. 1 the evaporator 6 contacts the inwardly facing surface of the outer flame tube wall 3A. The evaporator 6 comprises a plurality of helically wound tube windings 9 forming a coil. One end of the coil is connected through an inlet port 7 to a source of liquid hydrogen LH2. The port 7 preferably has a heat insulated inlet wall 7A. The other end of the helical coil is connected to an exit port 8 for discharging gaseous hydrogen GH2, preferably directly into the burner 2 through a short duct 8A. The just described construction assures that the helical coil covers at least a portion of the inner surface of the flame tube 3. The individual turns of the coil of the evaporator 6 are positioned to receive heat for the evaporation from the

[flame tube and may even be] hot gases flowing inside of the coil and are positioned [in heat exchange contact with] to protect the flame tube wall against thermal heat load.

The direct connection 8A of the discharge port 8 of the evaporator 6 to the combustor 2 provides a very compact, yet simple and economic construction. The integration of the evaporator 6 into the wall of the flame tube 3 achieves two advantages. First, the liquid hydrogen is evaporated substantially where it is needed. Second, this evaporation very efficiently cools the walls of the flame tube 3. It is no longer necessary to supply cooling air to the walls of the flame tube 3.

Additionally, any openings for cooling air are also no longer necessary. It is advantageous to configure the wall surface in heat exchange contact with the evaporator windings 9 so that optimally large contact areas are obtained, e.g. grooves in the wall surface may hug the windings 9.

Figure 2:
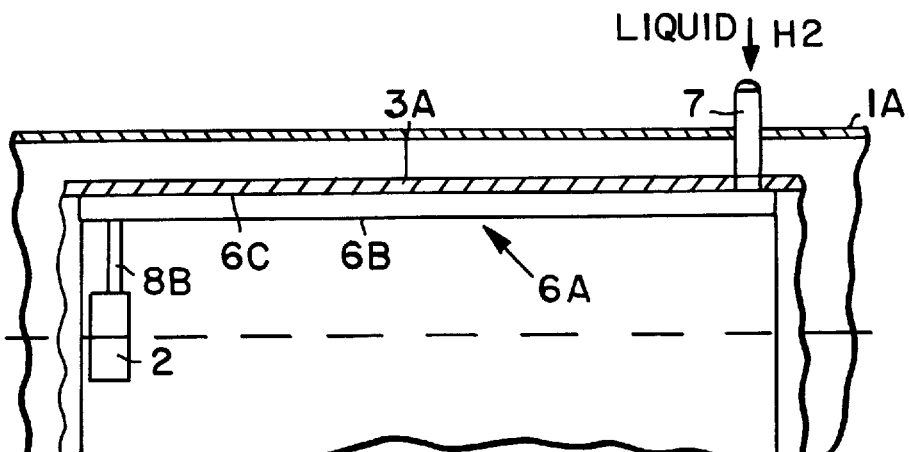
FIG. 2 shows schematically a combustion chamber wall in heat exchange contact with a double-walled hydrogen evaporator.

FIG. 2 shows another embodiment of the invention wherein the evaporator 6A has double walls 6B, 6C which are so-configured that these double walls will conduct the hydrogen flow through an efficient evaporation in the channels formed by the double walls 6B, 6C. In such an embodiment it is advantageous to make the inwardly facing surfaces of the flame tube walls smooth for an intimate heat exchange contact with the evaporator wall 6C. The outlet 8B of the evaporator 6A is directly connected to the burner 2.

Figure 3:
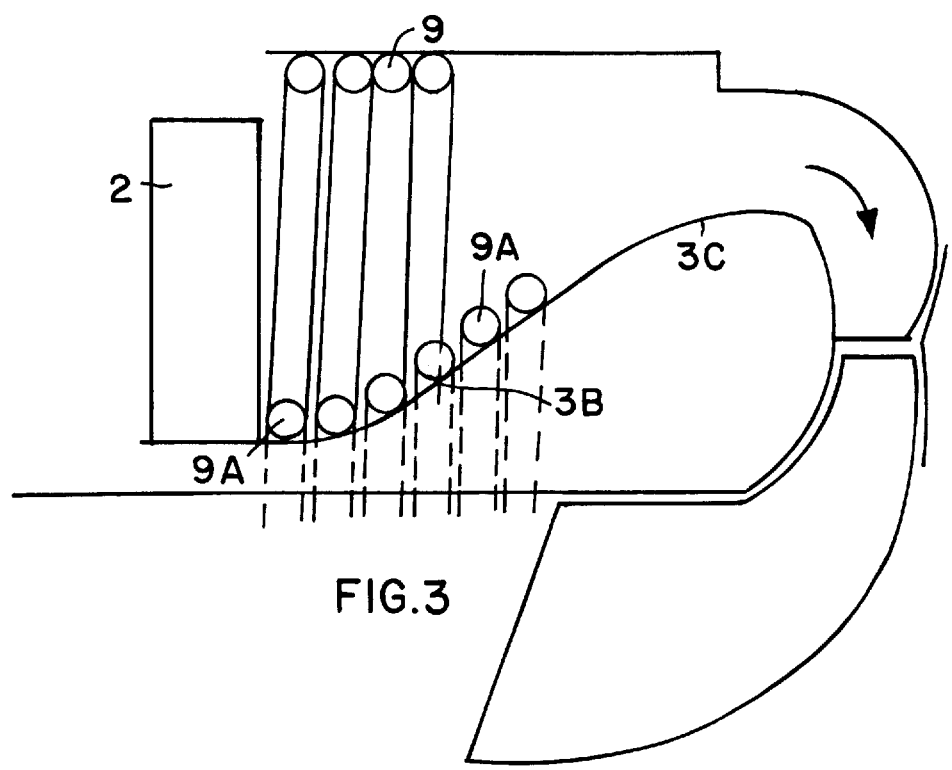
FIG. 3 shows a coiled hydrogen evaporator in heat exchange contact with a radially inner combustion chamber surface portion.

FIG. 3 shows another embodiment of the invention wherein the windings 9A of the evaporator coil are integrated and in heat exchange contact with the inner wall sections 3B, 3C of the flame tube 3. In this embodiment it is possible to altogether avoid the cooling openings 10 shown in FIG. 1 in the inner flame tube wall sections 3B and 3C. The outer wall of the flame tube 3 and/or the inner wall of the flame tube 3 may be provided with their respective evaporator coils.

An evaporator according to the invention can be dimensioned to cover the entire inner surface of the respective flame tube or just a portion thereof as required. Further, the invention is useful in ring combustion chambers as shown and in any type of combustion chamber having any conventional configuration such as multiple combustion chambers, tubo-annular combustion chambers, or specially shaped combustion chambers. If a turbine comprises a plurality of individual combustion chambers, each of those chambers can be provided with its own evaporator as taught herein, whereby the respective gaseous hydrogen discharge GH2 would be directly connected to the respective combustor 2.

Although the invention has been described with reference to specific example embodiments, it will be appreciated that it is intended to cover all modifications and equivalents within the scope of the appended claims.

What is claimed is:

1. A combustion chamber for a gas turbine engine using hydrogen fuel, comprising a housing (1A), a combustor (2) in said housing (1A), a flame tube (3) arranged in said housing (1A) downstream of said combustor (2) as viewed in the flow direction of combustion gases, said flame tube (3) being spaced from said housing (1A) thereby forming an air flow channel (1B) between said housing (1A) and said flame tube (3) for a flow of combustion air (CA) to said combustor (2), a hydrogen evaporator (6) for said hydrogen fuel, said evaporator (6) covering at least a portion of a flame tube wall for cooling and protecting said flame tube against said combustion gases while simultaneously converting liquid hydrogen into gaseous hydrogen for fueling said combustor (2), said evaporator having an inlet (7) for liquid hydrogen ($LH_2$) and an outlet (8A) feeding gaseous hydrogen ($GH_2$) directly into said combustor (2), and a turbine (5) positioned for receiving combustion gases from said combustor (2) through said flame tube (3) and through said evaporator (6) for driving said turbine (5).

2. The combustion chamber of claim 1, wherein said evaporator (6) comprises a helically wound tubular coil covering at least a portion of an inner wall surface of said flame tube.

3. The combustion chamber of claim 1, wherein said evaporator comprises a double wall.

4. The combustion chamber of claim 1, further comprising a duct (8A) directly connecting said outlet (8A) for gaseous hydrogen to said combustor (2).

5. The combustion chamber of claim 1, wherein said evaporator is positioned to receive heat from the hot gases flowing inside said flame tube for said evaporation.

6. The combustion chamber of claim 1, wherein said evaporator is positioned to protect at least a surface portion of said flame tube against a thermal heat load.

7. The combustion chamber of claim 1, wherein said evaporator forms at least a portion of a wall of said flame tube.

8. The combustion chamber of claim 1, wherein said turbine (5) is positioned radially inwardly of said flame tube and of said evaporator so that said turbine is surrounded by said hydrogen evaporator and by said flame tube.

9. The combustion chamber of claim 8, wherein said turbine is a radial turbine (5), wherein said flame tube (3) has a radially inwardly curved exit (4) for feeding said combustion gases into said radial turbine (5).

10. The combustion chamber of claim 1, wherein said hydrogen evaporator has a radially outer section (9) in contact with a radially outer wall portion of said flame tube (3), and a radially inner section (9A) in contact with a radially inner portion of said flame tube (3B).

11. The combustion chamber of claim 10, wherein said radially outer hydrogen evaporator section (9) and said radially inner hydrogen evaporator section (9A) form at least part of said flame tube.

12. The combustion chamber of claim 11, wherein said radially outer and inner hydrogen evaporator sections (9, 9A) form a flow guide channel for said combustion gases between said combustor and said turbine (5).

13. The combustion chamber of claim 1, further comprising a heat insulated inlet (7A) forming said liquid hydrogen inlet (7).

* * * * *

UNITED STATES PATENT AND TRADEMARK OFFICE
CERTIFICATE OF CORRECTION

PATENT NO. : 5,832,718
DATED : Nov. 10, 1998
INVENTOR(S) : Suttrop

It is certified that error appears in the above-indentified patent and that said Letters Patent is hereby corrected as shown below:

On the Title Page: in [56] References Cited U. S. PATENT DOCUMENTS,
    line 1, replace "2,221,477" by --2,621,477--.

Col. 3, line 1, before "hot" delete "[flame tube and may even be];
    line 2, after "positioned" delete "[in heat exchange contact with].

Signed and Sealed this

Twenty-sixth Day of October, 1999

Attest:

Q. TODD DICKINSON

*Attesting Officer*   *Acting Commissioner of Patents and Trademarks*